Dec. 29, 1931.  H. C. L. DUNKER  1,838,540
PROCESS FOR MANUFACTURE AND VULCANIZING OF RUBBER FOOTWEAR
Filed Feb. 18, 1926
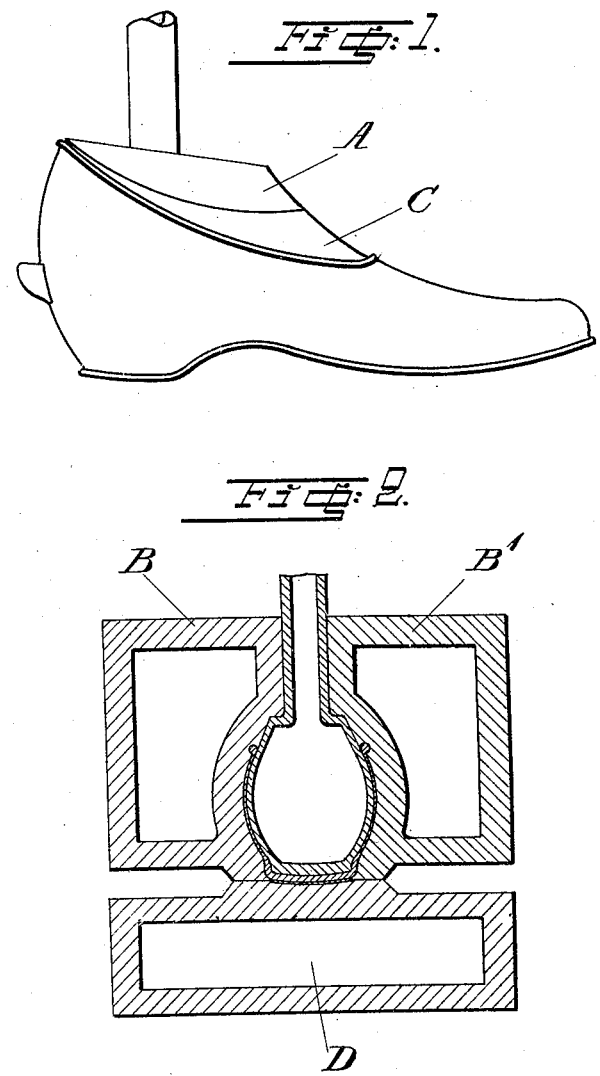
Inventor-
Henry Christian Louis Dunker.
by his Attorneys-
Howson + Howson Patented Dec. 29, 1931

1,838,540

UNITED STATES PATENT OFFICE

HENRY CHRISTIAN LOUIS DUNKER, OF HALSINGBORG, SWEDEN

PROCESS FOR MANUFACTURE AND VULCANIZING OF RUBBER FOOTWEAR

Application filed February 18, 1926, Serial No. 89,135, and in Sweden February 19, 1925.

The object of this invention is to provide a process for the manufacture of vulcanized soft rubber articles and more especially of rubber footwear, as rubber galoshes and canvas-shoes with rubber soles.

Heretofore, in the manufacture of rubber footwear and the like it has been customary to build these up on a last from a considerable number of pieces, said pieces being applied one by one and made to adhere to each other provisionally by applying a suitable adhesive, and then to vulcanize the footwear while on the last. Methods have been suggested also for the manufacture of rubber footwear by molding, the footwear being enclosed within the mold which has then been heated for the purpose of vulcanizing the molded article. As in this latter case the footwear has to remain in the mold for the whole period of vulcanizing, the output of articles manufactured per mold and day has been very small and the costs involved too high for commercial production.

The object of this invention is an improved molding process for rubber footwear and the like, whereby the difficulties referred to are obviated.

In the manufacture of a rubber overshoe or galosh according to the present invention a suitable lining of textile material is applied to the last and one or more pieces of a rubber compound is/are arranged around the last thus covered by the lining. Thereupon the parts of the outer mold consisting of two or more pieces, which have previously been heated are brought together about the last. By this operation the galosh is formed and superflous rubber removed. At the same time the rubber compound enters into the interstices of the textile material causing said material or lining to adhere strongly to the rubber. As soon as the article has been formed, the outer form pieces are removed. The heated mold parts on being pressed against the rubber causes a vulcanization of the surface of the same, which facilitates the removing of the mold parts after the article has been formed. Of course the mold may also be prepared in any other convenient manner to facilitate the removal of the mold. It may also be possible to use certain rubber compounds or some special material in the mold to make the rubber non-adhesive to the mold surface.

Recognizing the necessity for molding as many footwear as possible in a given time with a single molding apparatus, if economy in production is to result, it is important that the article to be molded remain in the molding apparatus only sufficient time to impart to the parts that necessary configuration conforming to the last which is to be the correct final shape of the footwear. Additionally, during this molding there is surface vulcanization of the rubber parts on the last in order that the mold may be removed immediately the molding step is completed.

The method as applied to the manufacture of a rubber overshoe will be described more detailed and shown in the drawings, by way of example only.

Figure 1 is a side view of a last with the vulcanized shoe thereon. Fig. 2 is a vertical cross-section of same.

A is a last, whereupon a lining C is applied in a convenient manner.

B and B¹ are the side-molds and D the bottom mold. The molds are hollow as shown to accommodate for the use of a heating fluid in preheating the molds before they are brought together on the article on the last.

When the shoe has been molded, the side-molds B, B¹ and bottom mold D are removed, and the shoe is vulcanized in the state shown in Fig. 1.

If a canvas-shoe with rubber sole is to be manufactured the process is the same but for the use of the rubber on the sole part only.

Heretofore it has been considered necessary to keep the mold compressed about the rubber articles during the vulcanization in order to obviate displacement of the rubber, which at the temperature used for the vulcanization is very soft. This necessitated using the molds not only during the molding, but also during the vulcanization of the article. Now, by way of example, rubber-shoes have to be manufactured in a great number of differently shaped models, which are subject to changes according to the varying of the shape of the shoes, to which they are to be fitted, and there is a great number of sizes of every type, and several molds may be required of every type and size. It is quite obvious then that such manufacture requires a great stock of molds and, therefore, will be uneconomical and technically unwieldy.

In using the present method the time during which the article is kept in the mold may be reduced to between 1/300 and 1/400 of the one now considered as a minimum, and the attained reduction of the number of necessary forms satisfactory solves the problem—cheap production of molded articles.

Though I have particularly described an embodiment of my invention it is quite obvious that it is given as an example only, and that the method applies to other kinds of molded soft-rubber articles also.

I claim:

1. A process of manufacturing rubber galoshes and rubber footwear with rubber soles and more or less rubber-covered sides, consisting in applying a lining and rubber parts to a last which is shaped to exactly conform to the final shape of the desired article, uniting the rubber and lining and shaping said parts to the final correct shape of the article by molds heated to an extent to insure that the surface of the article will be vulcanized to a degree to permit free separation of the molds and to fix the correct external shape of the article, opening the mold, and finally vulcanizing the article beyond the mold while maintaining the correct shape resulting from the molding.

2. A process of manufacturing rubber galoshes and rubber footwear with rubber soles and more or less rubber-covered sides, consisting in applying a lining and rubber parts to a last which is shaped to exactly conform to the final shape of the desired article, uniting the rubber and lining and shaping said parts to the final correct shape of the article by molds heated to an extent to insure that the surface of the article will be vulcanized to a degree to permit free separation of the molds without interrupting the correct shape of the article, opening the mold, and finally vulcanizing the article beyond the mold while maintaining the correct shape resulting from the molding on an appropriate last.

In testimony whereof, I have signed my name to this specification at Vienna, Austria, this first day of February, 1926.

HENRY CHRISTIAN LOUIS DUNKER.